Patented Jan. 4, 1927.

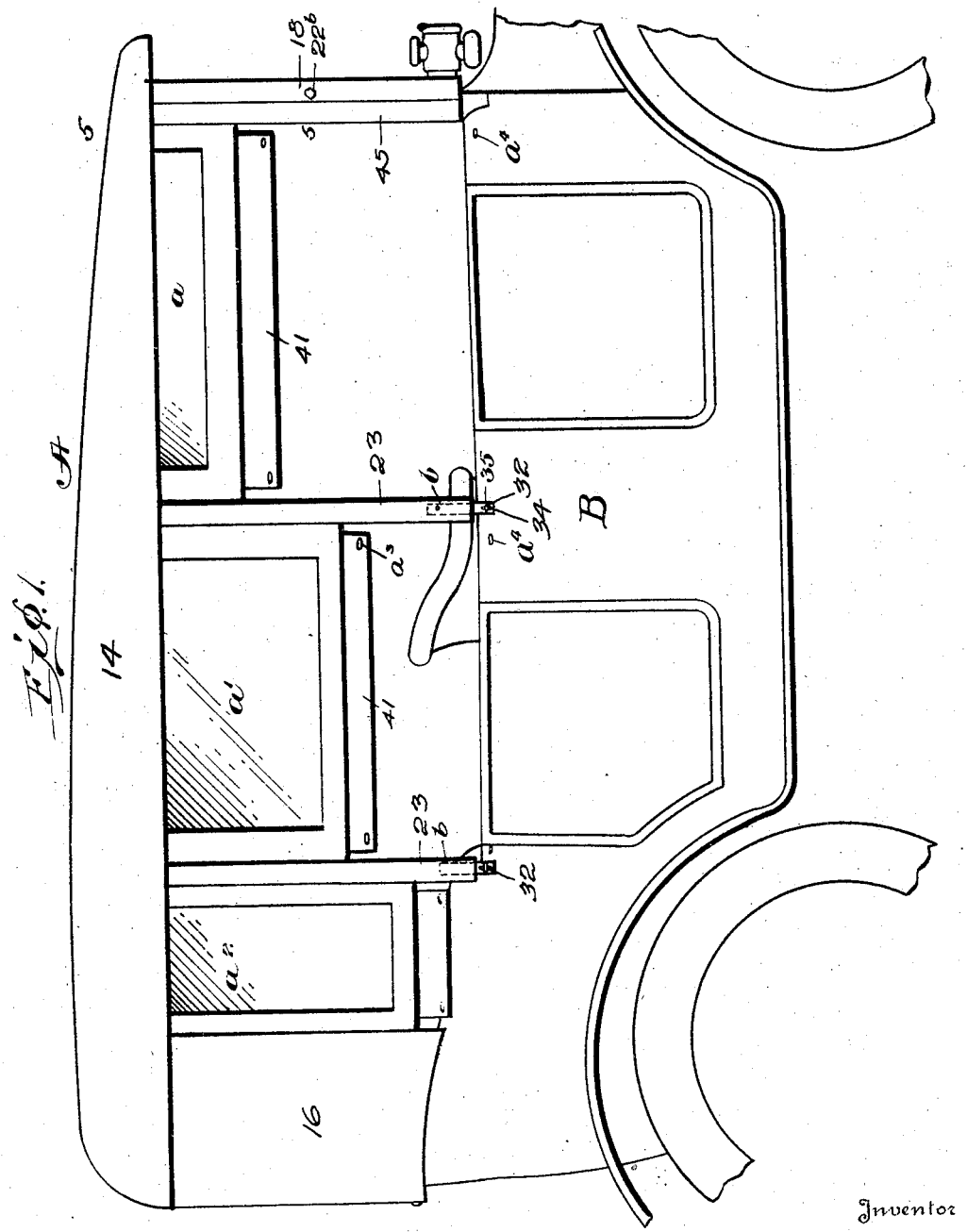

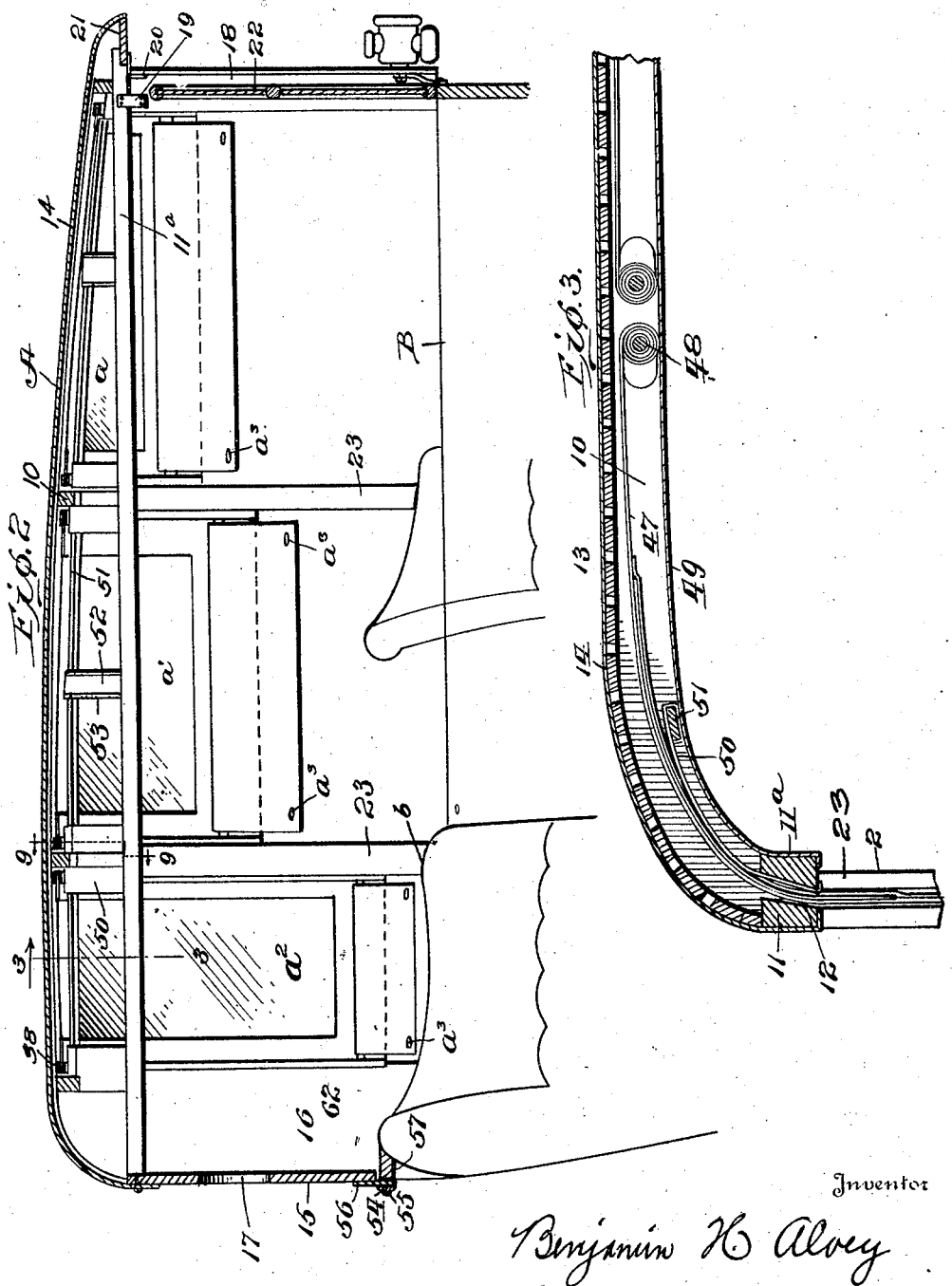

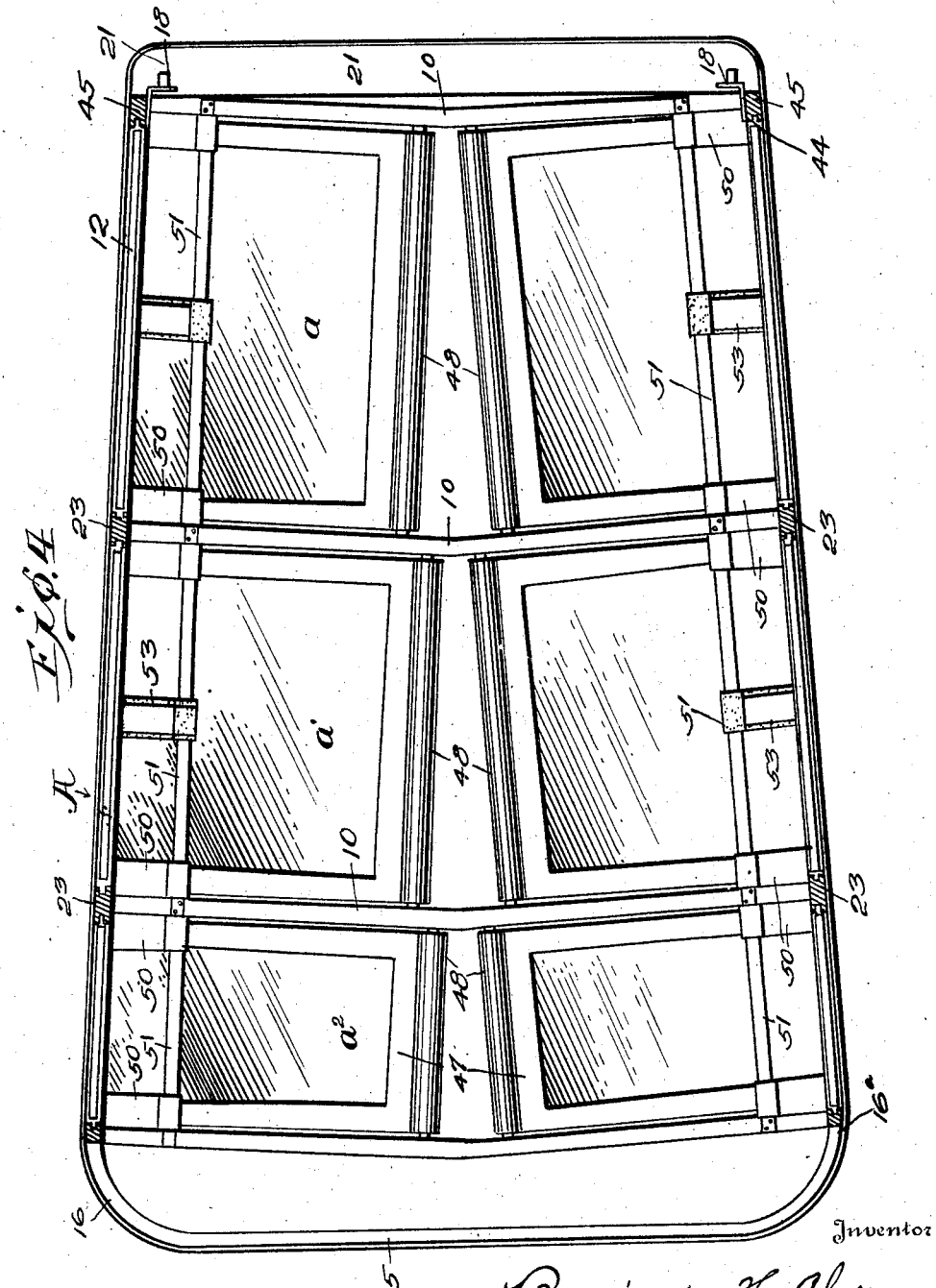

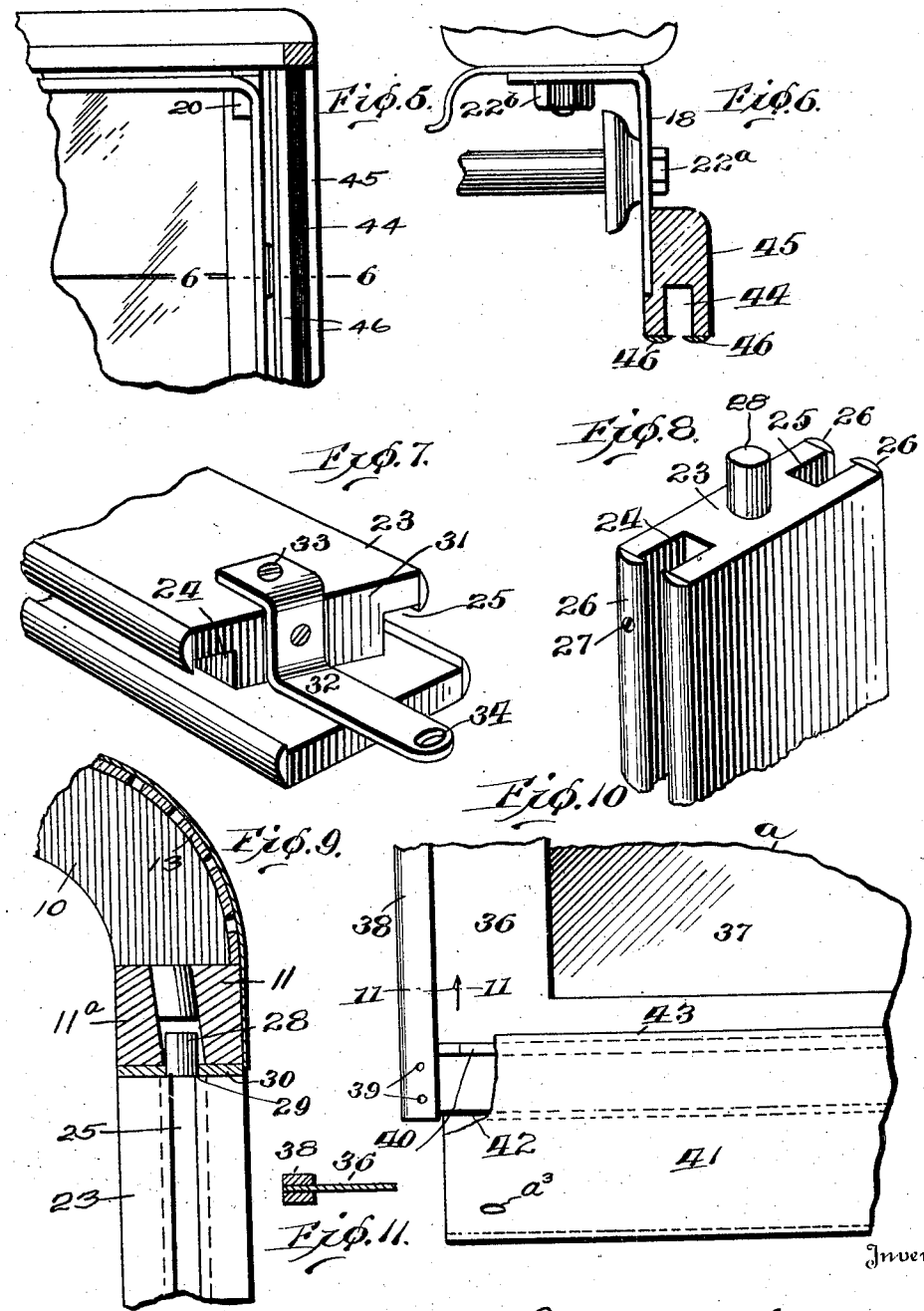

1,613,429

UNITED STATES PATENT OFFICE.

BENJAMIN H. ALVEY, OF LOUISVILLE, KENTUCKY.

AUTOMOBILE TOP.

Application filed July 11, 1917. Serial No. 179,875.

This invention has particular, though not exclusive, relation to vehicle tops of the convertible type; that is, tops so constructed that the body of the vehicle, to which they are applied, may be completely closed in inclement weather but which may be readily and quickly opened in pleasant weather and one of the principal objects of the invention is to provide a top of the type indicated embodying curtains for closing the sides of the vehicle, said curtains being carried by and forming a permanent element of the top together with retaining posts which extend between the upper edge of the vehicle body and the top and are mounted for quick removal or replacement and which serve, when in position, to engage the opposite longitudinal edges of the curtains to hold the curtains taut against the action of gusts of wind. The arrangement is such that when the posts are removed and the curtains raised, the sides are free of obstruction from the front to the rear of the vehicle. Important advantages arising from the aforesaid relation of parts will be fully set forth in the detailed description concerning the same.

A further object of the invention is to provide a top of the type indicated carrying spring rollers for drawing the curtains upwardly into the body together with means for causing said curtains to run true with respect to said rollers even though the top be wider at its rear end than at its front end.

Further objects of the invention are to provide improved means for supporting the top with respect to the body of the automobile; improved means for guiding the curtains in their travel; improved means for securing the retaining posts, hereinafter described, in position; an improved curtain construction whereby strains upon the curtain fabrics are largely eliminated; and a novel correlation and assembly of parts whereby I am enabled to utilize some of the existing parts of automobiles in securing the top in place thereon.

With these objects in view I have embodied my invention in a structure shown in the accompanying drawings, but which structure it is to be understood, is merely exemplary, since it is apparent that the invention may take many mechanical forms without departure from the spirit of the subjoined claims.

In the accompanying drawings—

Fig. 1 is a side elevation of an automobile top constructed in accordance with the invention and illustrating the same applied to an automobile.

Fig. 2 is a longitudinal, sectional view.

Fig. 3 is a partial, transverse, sectional view on line 3—3 of Fig. 2.

Fig. 4 is an underside plan view with the retaining posts in section.

Fig. 5 is a vertical section looking toward the front on line 5—5 of Fig. 1 and with the curtain omitted.

Fig. 6 is a horizontal section on line 6—6 of Fig. 5.

Fig. 7 is a detail perspective view of the lower end of one of the retaining posts.

Fig. 8 is a detail perspective view of the upper end of one of the retaining posts.

Fig. 9 is a vertical section on line 9—9 of Fig. 2.

Fig. 10 is a fragmentary view illustrating the lower portion of one of the curtains, and Fig. 11 is a sectional view on line 11—11 of Fig. 10.

Like characters of reference designate corresponding parts in all of the figures of the drawings.

In the drawings: A designates the improved top as a whole and B designates the body of the automobile to which the top is applied. The top includes a plurality of transverse bows 10 which extend between and are secured to side rails which, as clearly illustrated in Fig. 3 preferably are made of two members, marked 11 and 11ª, respectively. The portions 11 are wider at the top than at the bottom and the portions 11ª are wider at the bottom than at the top and these portions are spaced from each other to form a channel 12 through which the curtains slide as hereinafter described.

Longitudinal strips 13 shaped to conform to the shape of the top as a whole are secured to the bows 10 and a covering material 14, which may be of leather, pantasote or other suitable water-proof fabric, is secured in position over the strips 13.

The back and quarters of the top, indicated respectively at 15 and 16, are preferably formed of rigid material suitably shaped to conform to the curvature of the back of the body B and the back is preferably provided with a window 17.

This rigid construction of the back and quarters renders these parts an effective support for the rear end of the top A. The front end of the top is supported by a pair of vertically disposed angle irons 18. The upper ends of these angle irons are connected by plates 19 to the members 11ª of the side rails and by plates 20 to a transverse board 21 which constitutes a peak for the top and overhangs the wind-shield 22. The angle irons 18 not only serve to support the front end of the top but they constitute a partial housing for the wind-shield and in some constructions the nut 22ª of the hinge joint of the wind-shield is utilized to aid in supporting these angle irons, as will be hereinafter set forth.

23 designate retaining posts, the preferred construction of which is clearly illustrated in Figures 7 and 8 from which it will be seen that they are substantially H shape in cross section to provide longitudinal channels 24 and 25 at opposite sides thereof. Metal plates are secured to the outer longitudinal faces of each post by suitable fastening elements, indicated at 27, and which extend partially across the channels 24 and 25 so as to contract the mouths of the channels. The tops of the posts 23 are provided with upstanding pins 28, which, when the posts are placed in position, pass through openings 29 formed in plates 30, the latter being secured to the under faces of the members 11 and 11ª of the side rails, as shown in Fig. 9. The lower ends of the posts 23 are cut away at their inner sides as indicated at 31, (see Figure 7,) to cause their inner portions to conform to the outline of the seat arms as indicated at $b$ in Figure 1. These portions rest upon the seat arms and take the weight of the posts.

Plates 32 are secured to the posts 23 by screws 33 and these plates are provided with elongated openings 34 at their lower ends which are adapted to engage with the usual curtain retaining buttons 35, found upon some types of automobiles, though it is to be understood, of course, that other forms of retaining means for the lower portions of these posts may be provided.

For closing the sides of the vehicle, front curtains $a$, intermediate curtains $a'$, and rear curtains $a^2$ are provided. These curtains are or may be of similar construction and hence a description of one, the curtain $a$, for example, will suffice. This is shown best in Figure 10 and by referring to that figure it will be seen that it comprises a body portion of fabric indicated at 36 with a sight opening that is covered by any suitable flexible, transparent material 37, such as celluloid. Secured to the longitudinal edges of the body 36 are strips 38 of leather or the like. The lower ends of these strips 38 are secured by rivets or other suitable fastening devices 39, to a metal bar 40. The lower end of the curtain is of reduced width to form a depending flap 41 which is suitably formed to provide at its junction with the body of the curtain a pocket 42 which extends transversely of the curtain. The bar 40 is mounted in this pocket and its ends project therefrom.

The correlation of the parts is such that when the flap 41 is grasped and pulled downward the strain is transmitted largely through the strips of leather, 38, and thereby the fabric 36 and the celluloid 37 are relieved of a large part of the strain which would otherwise be brought thereupon.

When the vehicle is to be converted into a closed type vehicle the retaining posts 23 are placed in position and, in conjunction with other parts of the structure receive the leather strips 38. The rear edge of the front curtain $a$, on each side, is retained in the channel formed in the front edge of the corresponding post 23 while the front edge of the front curtain on each side is guided in a corresponding channel 44 formed in a block 45 that is secured to the corresponding angle iron 18, it being understood that plates 46 serve the same function in this relation that the plates 28 serve in connection with the posts 23, that is, they serve to provide contracted mouths through which the leather strips 38 cannot pass, whereby the curtains are held taut against the force of gusts of wind.

The front edges of the intermediate curtains $a'$ are retained in the channels formed in the rear edges of the front post 23, while the rear edges of these intermediate curtains are guided in corresponding channels formed in the front edges of the rear post 23. The front edges of the rear curtains $a^2$ are guided in the channels formed in the rear edges of the rear post 23 while the rear edges of the rear curtains are guided in correspondingly shaped channels formed in the front edges of the quarters 16. The flaps 41 are provided with eyelets or buttonholes $a^3$, adapted for engagement with buttons $a^4$ of the usual type on the automobile body whereby the lower ends of the curtains may be secured to the said body.

The upper edges of the curtains are connected to webs 47 and these webs in turn are connected to spring rollers 48 of the well known shade roller type which act to draw the curtains upwardly into the space between the roof formed by the strip 13 and fabric 14, and a lining 49 which is secured to the bows 10 and which completely houses the spring rollers and the curtains. For guiding the several curtains around the side quarters between the top and sides of the structure sheet metal plates, 50 which may be of tin, have their upper ends bent around and secured to longitudinally extending strips 51 which are recessed into the under faces of the bows 10. The lower ends of these metal plates 50 are secured to the inner portions 11ª of the rails 11. The plates 50 are arranged in such position that the fabric portions of the curtains contact thereover in the passage of the curtains thereover. However, in the case of wide curtains it may be desirable to provide intermediate supporting plates 52 corresponding in shape to the plates 50 and supported in the same manner, but since these intermediate plates will lie in such position that the celluloid portions of the curtains will travel thereover, I preferably face the upper sides of these plates 52 with fabric, indicated at 53, to prevent the celluloid from being scratched or cracked.

Upon reference to Fig. 4 it will be seen that the top A tapers from the rear toward the front. To cause the several curtains to run smoothly and truly upon the respective spring rollers despite this converging of the sides of the top, the bows 10 are so shaped that their opposite end portions lie at such an angle with relation to each other that when the spring rollers are mounted perpendicularly between adjacent bows the rollers will lie in parallelism with the sides of the top. This is a feature of considerable advantage since it maintains parallelism with the upper edge of the body of the car and prevents any tendency of the curtain to twist or to move laterally within the channels in the posts 23 and corresponding parts.

While the general features of the invention are applicable to automobiles of various types, certain of the details of construction herein shown and described particularly adapt the structure to be used in conjunction with automobiles of the Ford type. For instance, the openings 34 of the posts 23 may be engaged with the usual curtain retaining buttons of the Ford automobile, the nut 22ª of the hinge joint of the Ford windshield may be caused to engage with the side members 18 of the angle irons while the nut 22ᵇ of the lamp bracket of the Ford automobile may be caused to engage the front members of the angle irons 18.

Furthermore the back 15 and the quarters 16 may be secured in place at their lower edges by screws 54 and binding strips 55, these parts being usual in the Ford construction and normally serving to hold the lower edge of the fabric which constitutes the back of the Ford top. By providing a comparatively thin metal plate 56 at the lower edge of the back 15 and quarters 16, the strip 55 may be removed, the back 15 and quarters 16 placed in position and then the strip 55, and screws 54 restored to their former place, whereby the back and quarters will be securely bound in place against a strip 57 which extends around the upper rear edge of the rear seat of the Ford automobile.

Since the shape of the Ford seat arms are such as to limit the downward movement of the curtains to a position where the curtains would not completely contact with tops of the doors throughout the width of the latter, the flaps 41 are utilized to cover the intervening space as well as to provide a hand grasp by which the curtains may be drawn downwardly.

From the foregoing description it will be seen that the present invention comprises simple and efficient means for accomplishing the objects sought. The structure is such that the top may be quickly and easily placed in position by lifting the top into position upon the body of the automobile and by placing the screws 54 and strips 55 in position as described. Then by causing the angle irons 18 to be engaged by the nuts 22ª and 22ᵇ and by slipping the pins 28 of the posts 23 into the pockets provided by the openings 29 in the plates 30 and by engaging the openings 34 of the plates 32 over the curtain retaining buttons of the automobile body, the whole structure is rendered ready for use as a closed, or winter, car.

The vehicle is converted into an open, or summer, car by merely permitting the spring rollers 48 to draw the curtains upwardly into the space between the roof and the lining of the top and by the removal of the posts 23. It will be noted that this is an operation that requires no mechanical skill and only a few minutes time. When converted into an open or summer car it is not ordinarily necessary to place the posts 23 in position, to protect the occupants against summer showers, because the curtains may be drawn down and fastened in lowered position without the posts 23 being in place. However if the violence of the storm be such as to render it advisable to utilize the posts to engage the opposite longitudinal edges of the curtains to hold them taut against the action of gusts of wind, the operation of putting these posts in place may be quickly carried out.

Having described my invention what I claim is:

1. A top comprising, in combination, a non-folding roof having means by which it may be rigidly supported wholly from its front and rear ends, flexible curtains, side posts having retaining means for the longitudinal edges of the curtains to guide and hold the same and also having means for releasably securing them to the body and roof in operative relation with the curtains and permitting them to be removed to release the curtains and to leave the sides of the top entirely clear when the curtains are raised, and means independent of the side posts for supporting the curtains permanently from the roof and for drawing them up under the roof.

2. A top comprising, in combination, a rigid roof, side posts having retaining means for the longitudinal edges of the curtains, to guide and hold the same, and also having elements of fastening means for securing them in operative relation with the edges of the curtains and permitting them to be moved to release the curtains and to leave the sides of the top entirely clear when the curtains are raised, and means, independent of the side posts, for supporting the curtains permanently from the roof and for drawing them up under the roof.

3. A top comprising, in combination, a rigid roof having longitudinal side rails provided with openings, flexible curtains movable through said openings, side posts having retaining means for the longitudinal edges of the curtains, to guide and hold the same, and also having elements of fastening means for securing them in operative relation with the edges of the curtains and permitting them to be moved to release the curtains and to leave the sides of the top entirely clear when the curtains are raised, said retaining means for the longitudinal edges of the curtains being co-incident with the openings in the side rails, and means independent of the side posts for supporting the curtains permanently from the roof and for drawing them up under the roof.

4. A top comprising, in combination, a rigid roof having longitudinal side rails provided with openings, flexible curtains movable through said openings, perforated plates secured to the under faces of the side rails, adjacent the edges of the curtains, side posts having retaining means for the longitudinal edges of the curtains, to guide and hold the same, said retaining means being co-incident with the openings in the side rails, said posts also having upward projections to enter the perforations in the plates and elements of means for fastening them releasably to the structure to which the top is applied, whereby they may be entirely removed from said structure and top to leave the sides of the latter entirely clear when the curtains are raised, and means independent of the side posts for supporting the curtains permanently from the roof and for drawing them up under the roof.

5. An automobile top comprising a roof, channeled retaining posts for the closures of the top, said posts having cut-away inner portions to overlie the sides of an automobile body and having a slotted element to be engaged by one of the usual curtain retaining buttons of the automobile body, and means held by the posts and engageable with the roof by upward movement of the posts with respect to the roof.

6. The combination with a vehicle body having lateral fastening elements, of a top, comprising a roof portion having sockets, closures for the sides of the top, arranged to be opened, and removable retaining posts for the edges of the closures, having their upper ends provided with dowel pins, to enter the sockets in the roof portion, and hold the upper ends of the posts to the roof and their lower ends cut away on their inner sides; and provided at their cut away portions with depending projections having openings below the cutaway portions to receive the fastening elements on the body.

7. A top comprising rails extending along its lower edges, curved bows extending between said rails, strips extending longitudinally of the top and secured to the bows adjacent the outer edges of the top, curved guide members extending between said strips and rails and having their opposite ends secured thereto, and curtains slidable over said guide members and guided thereby in an arcuate path about the bends at the edges of the top.

8. In a vehicle top, a roof curved adjacent its edges and having rails extending along its edges, bows extending between said rails, strips extending longitudinally of the roof and secured to the bows in spaced relation to the rails, and curved metal strips extending around the curve at the edges of the roof and each secured at one end to a rail and at the other end to the corresponding longitudinally extending strip, in combination with flexible closures for the sides of the top, having means by which they may be drawn upwardly under the roof and traverse the curved metal strips in their passage around the bends.

9. A top comprising, in combination, a rigid roof, flexible curtains, side posts having retaining means for the longitudinal edges of the curtains, to guide and hold the same, said posts also having elements of fastening means for securing them in operative relation with the edges of the curtains and permitting them to be moved to release the curtains and to leave the sides of the top entirely clear when the curtains are raised, curved guide members coincident with the retaining means of the posts and extending upwardly from the same and partway across the roof, and means at the ends of the guide members remote from the posts, for carrying said curtains and drawing them upwardly under the roof, said means being carried by the roof and supporting the curtains independently of the side posts.

10. The combination with a vehicle body having a wind shield adjacent the front thereof and vertically disposed rigid members attached to said wind shield, of a top having a rigid roof, supported at the front by said vertically disposed members and having a rigid back and rear quarters for supporting its rear end, said roof being wider at its rear end than at its front end, posts removably mounted between the upper edges of the vehicle body and the lower edge of the roof, said posts having vertical guide grooves in their edges, spring actuated rollers for the curtains, supported by the roof and arranged underneath the same in a spaced relation to the longitudinal edges of the roof and parallel with said edges, and curtains upon said roller, of such width as to fill the space between the posts and to travel with the vertical edges in said guideways.

11. The combination with a vehicle body having a wind shield adjacent the front thereof and vertically disposed rigid members attached to said wind shield, of a top comprising a roof supported at the front by the rigid members and having a rigid back and quarters for supporting its rear end, posts removably mounted between the roof and the vehicle body, and flexible closures for the sides of the top, said closures being permanently carried by the roof and guided by said posts.

12. In an automobile top, the combination with the roof thereof, of means for supporting the front end of the roof from an automobile body, comprising a pair of angle irons, means for connecting the upper ends of the angle irons to the roof and means for connecting intermediate portions of said angle irons to a part of the wind shield structure.

13. In an automobile top, the combination with the roof thereof, of means for supporting the front end of the roof from an automobile body, comprising a pair of angle irons, means for connecting the upper ends of the angle irons to the roof, means for attaching the lower portions of said angle irons to the usual lamp brackets of the automobile, and means for connecting intermediate portions of said angle irons to a part of the wind shield structure.

14. In a top construction, a curtain having an insert of flexible transparent material, a plurality of curved guide members over which the curtain slides and by which the direction of movement of the curtain is changed, one of said guide members being disposed in alinement with the transparent material and having a facing of fabric to prevent the transparent material from being injured in the passage over the guide member.

15. A top wider at its rear end than at its front end comprising a plurality of transverse bows, the portions of said bows upon opposite sides of the center line of the top lying at such angle with relation to each other that a line perpendicular to said portion of the bows will be parallel with the corresponding longitudinal edge of the top.

16. A top wider at its rear end than at its front end comprising a plurality of transverse bows, the portions of said bows upon opposite sides of the center line of the top lying at such angle with relation to each other that a line perpendicular to said portions of the bows will be parallel with the corresponding longitudinal edge of the top, spring rollers mounted perpendicularly between said portions of the bows, and curtains upon said spring rollers.

17. A top comprising forwardly convergent side rails, a plurality of transverse bows extending therebetween, those portions of the bows upon opposite sides of the center line of the top lying perpendicular to the adjacent side rail, supporting strips extending in parallelism with the rails and supported from said bows, curved guiding means extending between said strips and the adjacent rail, curtains slidable over the guide means and spring rollers mounted perpendicularly between the bows and by which said curtains are moved in one direction, said spring rollers lying in parallelism with the adjacent strips and rails.

In testimony whereof I affix my signature.

BENJAMIN H. ALVEY.